US010718717B2

(12) United States Patent
Smorgon et al.

(10) Patent No.: US 10,718,717 B2
(45) Date of Patent: Jul. 21, 2020

(54) INSPECTION OF SEALING QUALITY IN BLISTER PACKAGES

(71) Applicant: EMAGE VISION PTE. LTD., Singapore (SG)

(72) Inventors: Sergey Smorgon, Singapore (SG); Bee Chuan Tan, Singapore (SG); Chern Fei Chua, Singapore (SG); Ya'akob Bin Mohamed, Singapore (SG)

(73) Assignee: EMAGE VISION PTE. LTD., Singapore (SG)

( * ) Notice: Subject to any disclaimer, the term of this patent is extended or adjusted under 35 U.S.C. 154(b) by 0 days.

(21) Appl. No.: 15/062,288

(22) Filed: Mar. 7, 2016

(65) Prior Publication Data
US 2016/0258880 A1 Sep. 8, 2016

(30) Foreign Application Priority Data
Mar. 5, 2015 (SG) .............................. 10201501672P

(51) Int. Cl.
*G01N 21/88* (2006.01)
*H04N 5/225* (2006.01)
(Continued)

(52) U.S. Cl.
CPC ..... *G01N 21/8806* (2013.01); *G01N 21/8851* (2013.01); *G06T 7/001* (2013.01); *H04N 5/2256* (2013.01); *H04N 5/33* (2013.01); *G01N 2021/9583* (2013.01); *G01N 2201/062* (2013.01); *G01N 2201/12* (2013.01);
(Continued)

(58) Field of Classification Search
CPC ........... G01N 21/8806; G01N 21/8851; G01N 2201/062; G01N 2201/12; G06T 7/001; G06T 2207/10024; G06T 2207/30108; H04N 5/2256
See application file for complete search history.

(56) References Cited

U.S. PATENT DOCUMENTS 5,568,715 A * 10/1996 Ebel ...................... B07C 5/3404
53/54
5,943,436 A * 8/1999 Ebel ...................... B65B 25/008
382/143

(Continued)

*Primary Examiner* — Manav Seth
(74) *Attorney, Agent, or Firm* — Schwegman Lundberg & Woessner, P.A.

(57) ABSTRACT

An inspection system to inspect the consistency and thermal seal quality of blister packages, the system comprising an illumination module and a color imaging device suitably integrated with an optical module. The blister packages that are thermally sealed are sequentially presented to the color imaging device within its Field of View whereupon the inspection captures multiple images of the illuminated top side of the sealed blister package using the said image pickup devise. The images then undergo analysis to determine the gray scale values of the sealing area. By comparing the gray level values with predetermined gray level values that are programmed at setup, a decision is made to reject the inspected item if the analyzed gray level values is not substantially the same as the predetermined gray level values, or to accept the inspected item if the analyzed gray level values is substantially the same as the predetermined gray level values or rejecting the blister if determined otherwise.

17 Claims, 3 Drawing Sheets

(51) Int. Cl.
*G06T 7/00* (2017.01)
*H04N 5/33* (2006.01)
*G01N 21/958* (2006.01)

(52) U.S. Cl.
CPC .............. *G06T 2207/10024* (2013.01); *G06T 2207/30108* (2013.01)

(56) References Cited

U.S. PATENT DOCUMENTS

| | | | | |
|---|---|---|---|---|
| 6,757,420 | B2 * | 6/2004 | Krahn | G01N 21/9508 |
| | | | | 250/223 B |
| 6,840,108 | B2 * | 1/2005 | Stauffer | G01L 3/24 |
| | | | | 73/40.5 A |
| 7,017,391 | B2 * | 3/2006 | Klein | G01M 3/227 |
| | | | | 73/40.7 |
| 7,673,498 | B2 * | 3/2010 | De Baerdemaeker | |
| | | | | B29C 66/963 |
| | | | | 73/52 |
| 2005/0226488 | A1 * | 10/2005 | Barry | B07O 5/3422 |
| | | | | 382/141 |
| 2006/0171041 | A1 * | 8/2006 | Olmstead | G02B 27/0075 |
| | | | | 359/738 |
| 2006/0277975 | A1 * | 12/2006 | Barcan | G01M 3/027 |
| | | | | 73/37 |
| 2007/0296963 | A1 * | 12/2007 | Parker | G01N 21/55 |
| | | | | 356/240.1 |

\* cited by examiner

120

INSPECTION OF SEALING QUALITY IN BLISTER PACKAGES

CLAIM FOR PRIORITY

This application claims priority to Singapore Patent Application No. 10201501672P, filed on 5 Mar. 2015; which is incorporated herein by reference in its entirety.

FIELD OF THE INVENTION

The present invention relates to an apparatus for inspecting heat sealing quality of containers containing Ophthalmic lens. More specifically, the present invention relates to an apparatus and method to inspect the seal quality using an illuminator designed with multiple wavelengths of LED lighting segments.

BACKGROUND OF THE INVENTION

The present invention relates to an inspection system in an automated production line. More particularly, the invention relates to a system and method of inspection of ophthalmic lens blisters after they are thermally sealed.

Ophthalmic lenses are packaged in small containers commonly called as blister packs. The containers typically contain a single ophthalmic lens submerged in a solution. Typically a printed foil made of aluminum is applied with a heat seal coating of the Vinyl type, or coatings based on cellulose nitrate, ethyl celluloses, methacrylates, Chlorinated rubbers or rubber polymers depending upon the application. Such a foil is applied to the top of such containers and sealed thereto to form an airtight seal that prevents the solution from leaking out of the container and thereby exposing the ophthalmic lens to contamination. The sealing quality is critical as it determines the quality of the lens. A good seal protects the lens therein from getting contaminated. A faulty seal can expose the solution and the lens to oxidation and result in the entire product to be discarded due to contamination. The inspection system and the related software inspects the captured images in and around the sealing area of the pocket and makes a decision of the sealing quality by applying several types of algorithms to check the uniformity of the seal in comparison with a predetermined pattern. The pattern may include but not limited to gray scale levels of a batch of pixels in three different color planes and width of the sealing pattern in different color regions. The difference in the calculated values compared with a predetermined set of values is then compared with the acceptable values stored in memory during configuration setup for a particular model of the product. The comparison is repeated over the entire perimeter of the seal. If any value falls outside the preset range, the product will be classified as a reject. If all values fall within the preset range, the product will be classified as a pass.

For a perfectly good seal, the thermal heat and pressure applied to the sealing foil and the time for which it is applied at the correct position has to be optimal and consistent. If the process of sealing is controlled to maintain the parameters from blister to blister, the range of gray level values at the thermally sealed areas under multiple illumination types will be consistently uniform for a good seal.

The sealing is performed around the perimeter of the container using an automated mechanism that have heated blocks of metal the shape of which is customized to seal only the periphery of the blister socket. The heated block is pressed against the top side of the foil at a predetermined pressure, to form a bond between the foil and the plastic foil and the container therein. Even though the sealing mechanism is automated, problems occur during the sealing process. (For Eg.): Improper positioning of the plastic container may result in the sealing being offset, insufficient temperature of the heated blocks of metal that result in a weak seal . . . etc. These deficiencies in the process results in an imperfect seal that will result in leaking of the saline solution leading to contamination and other forms of damage to the lens. Such defective blister packs are then shipped to the customer. It is therefore desirable to inspect the sealing quality, to ensure that imperfectly sealed blisters are detected and removed to enable good quality product is delivered to the customers.

Current methods of inspection include manual inspection of statistically sampled blisters at different process points, Manual inspection using UV light, testing in vacuum enclosures and manual inspection of back lit blisters. Manual inspection is highly prone to human mistakes and not effective especially for mass production.

In one form of inspection, infrared Cameras are used to check the sealing quality by analyzing the thermal images captured immediately after thermal sealing process. This method requires accurate timing for image capture to maintain consistency of thermal characteristics from package to package. A drawback encountered in this system and method of inspection, is the need to have consistent blister package quality and precise control over temperature of the sealing pads to ensure stability in image quality. Moreover some of the defects cannot be enhanced in the infrared region of illumination. There is a high probability that defective seals can be passed off as good seal.

Prior art discloses a system for inspecting contact blister package utilizing a camera that captures images of the bottom side of the blister. Such images are not suitable to perform a proper inspection of the seal which is present at the opposite side of the blister. This method and apparatus suffers from a drawback in which the blister pack polymer material prevents or masks important features of the sealing area leading to false rejects or in worse cases faulty seal blisters being shipped to customer.

This imaging technique is able to inspect foreign particles within the sealed area, but it is not effective for inspecting the sealing quality. Most of the sealing related defects have very low contrast in such configuration because of the presence of the semi-transparent blister polymer material.

Prior art also discloses the use of Thermal imaging to inspect the quality of the sealing. Thermal imaging techniques are unable to detect very fine defects such as gaps and bubbles within the sealing area.

Further, in prior art systems, images are captured under a single illumination typically with a dedicated wavelength. The resulting image is compromised as many types of defects are not highlighted. The image is therefore is unreliable for inspection resulting in defective products shipped to the customer.

It is well known that manual inspection is neither reliable nor efficient.

It is therefore desirable to have a robust system and method to accurately inspect the sealing quality of the blister packs from the top side where the thermal seal of the blister is visible. Images captured in this configuration enables the system to detect multiple defects such as air gaps in the sealing area, missing seal, imperfect seal and contaminated particles within the seal, so as to reject and remove imperfectly sealed blister packs and ensure good quality product is shipped to the customer.

SUMMARY

In a first aspect of the present invention an inspection system is provided to inspect the seal area of the blister package. Preferably, the inspection system consists of an image capture device (For eg: Camera) directed towards the entire top surface of the blister package which is preferably illuminated with a ring light capable of emitting different wavelengths of illumination to highlight different areas of the thermal seal and its perimeter. The image capture device is preferably directed towards the top surface of the Blister pack containing the contact lens. Further preferably, the system enables a method of capturing images by simultaneously switching ON different illumination wavelengths to highlight different area of seal defects.

In another aspect of the invention, the inspection system camera is directed to the top side of the blister with the illumination preferably mounted above the top surface of the blister below the camera. Further preferably, a system and method is provided to selectively switch On and Off different segments of the illumination, to enhance different types of features on the blister pack.

Further details and advantages of the invention may be seen from the description and the drawings that follow.

DETAILED DESCRIPTION OF DRAWINGS

The system of the present invention utilizes preferably a camera and an optical module suitably integrated with an illumination module comprising at least one set of Light emitting diodes hitherto referred as LEDs, of different wavelengths and preferably different polarization. The illumination module is suitably triggered with an electrical pulse to switch ON the respective segments of LED's. The same electrical pulse is preferably used to trigger to capture a high resolution image. By using multiple wavelengths of illumination, the camera captures multiple high resolution images. The resultant images captured consists of different types of defects that are enhanced when illuminated with different wavelengths of illumination which aids in improved quality of inspection, both in terms of accuracy and inspection speed.

Through several experiments it has been identified that the sealing quality inspection is significantly improved by capturing at least a single image of the blister sealing area that is illuminated with for example, Red, Green and Blue LEDs as their wavelengths are different.

It has been found that with single dedicated wavelength of illumination, it is impossible to highlight all types of defects with good contrast. With multiple wavelength illumination, the resulting image acquired has sufficiently good contrast that is able to identify different types of sealing defects.

Figure 1:
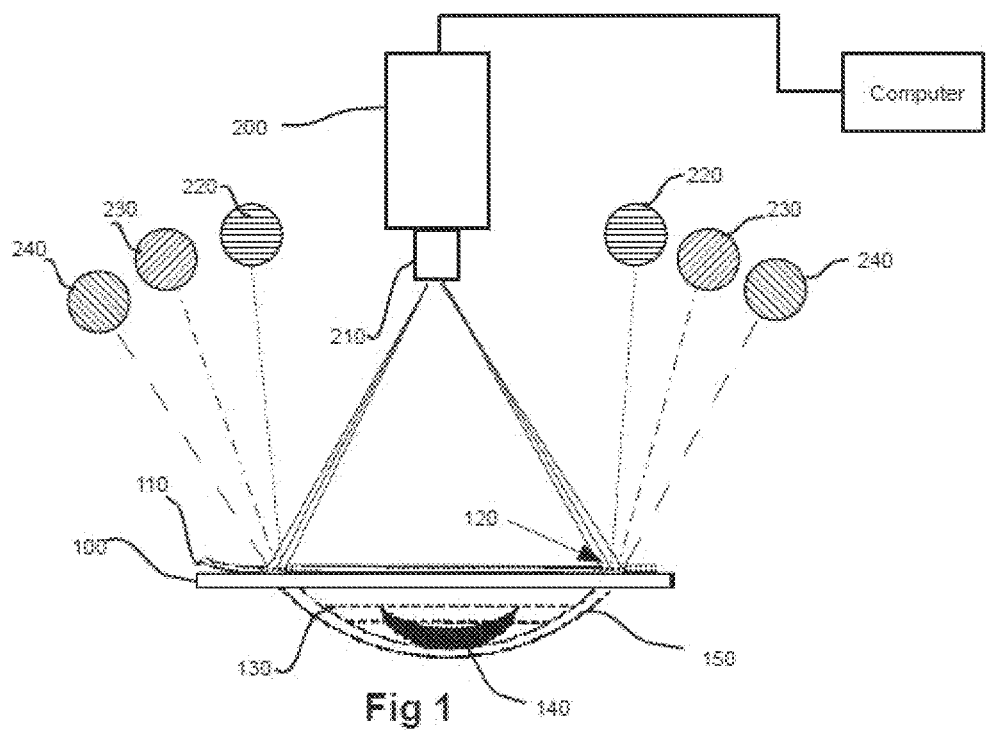
FIG. 1 is a schematic view of the inspection system set-up of the present invention.

According to the present invention, a preferred embodiment will be described with reference to the drawings mentioned. Referring to FIG. 1, the inspection system consists of a camera 200 which is integrated with an optical module 210 and the illumination module 220, 230 & 240. The illumination module may be arranged in a circular formation to form a Ring type illuminating setup. A person skilled in the art will realize that the arrangement of the illumination can be modified to suit the type of defects to be inspected. In a preferred embodiment of the invention, the illumination modules 220, 230 & 230 are strobed at different intervals to obtain multiple images. Suitable time delays between camera trigger and illumination trigger may be preferably used to achieve an enhanced image to improve the contrast of different types of defects. The camera and an illumination controller (not shown) are suitably controlled by the computer. The imaging devices are preferably high resolution color cameras. The camera and illumination are directed at the Blister package 100 to be inspected. FIG. 3 represents a cross sectional view A-A of blister package 100 shown in FIG. 2.

Figure 2:
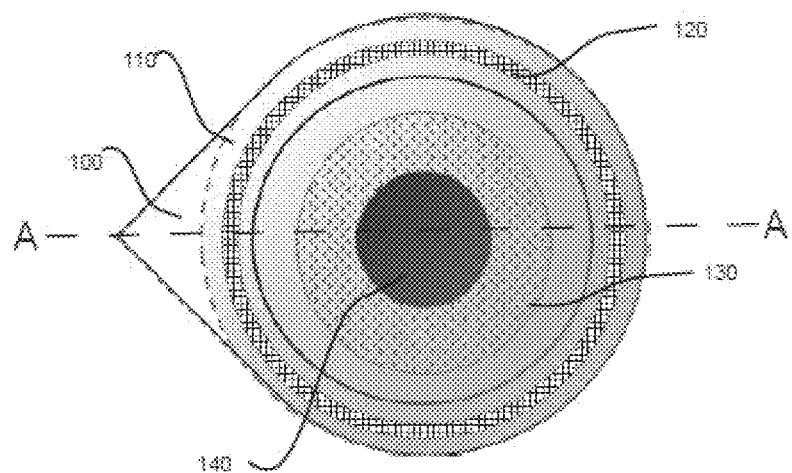
FIG. 2 is a Top view of the blister package.
Figure 3:
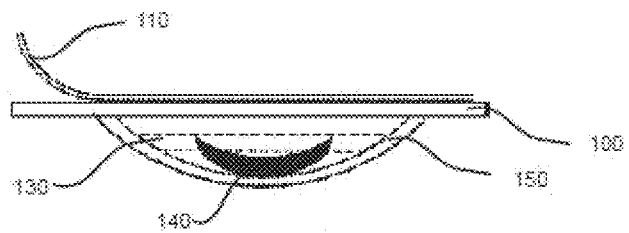
FIG. 3 is a cross-sectional view of the blister package as taken generally along the line A-A of FIG. 2.

FIG. 2 represents the Top view of the blister package clearly showing the area of the seal 120 that is thermally bonded to the top surface of the blister 100. It is the system and method of inspecting the sealing quality of the thermally sealed perimeter area 120 that forms the basis of this invention.

FIG. 3 shows a cross sectional view of the Blister package 100 that contains the lens 140 suspended in the recess 150 which is filled with saline solution 130 to prevent contamination of the lens 140 therein. A blister foil 110 is hermally sealed on the top surface of the blister surface 100. The thermal seal is achieved by a sealing station (not shown) that may comprise a heat sealing shoe which applies heat and pressure to the top of the foil 110 over the perimeter area 120, thereby creating an air tight bond between 110 and the top surface of blister package 100. It is therefore apparent that the sealing quality of the blister package is perfect to ensure the user receives a contamination free product.

Figure 4A:
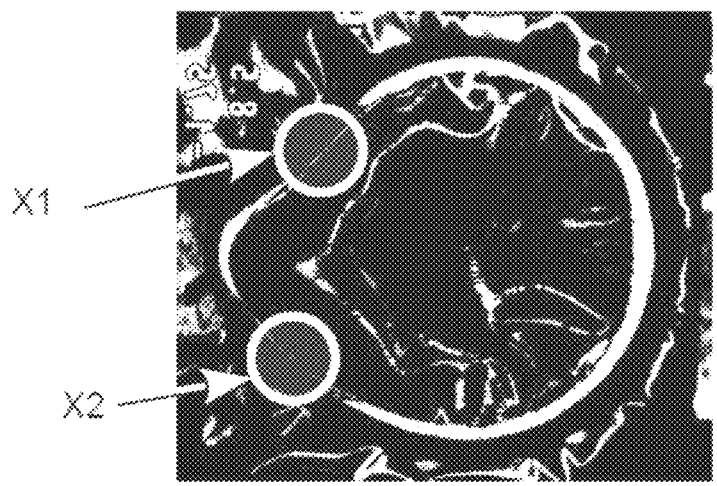
FIG. 4A hows an extracted gray scale image of FIG. 4D enhanced by illumination with wavelength in the region of 520-550 NM wavelength.
Figure 4B:
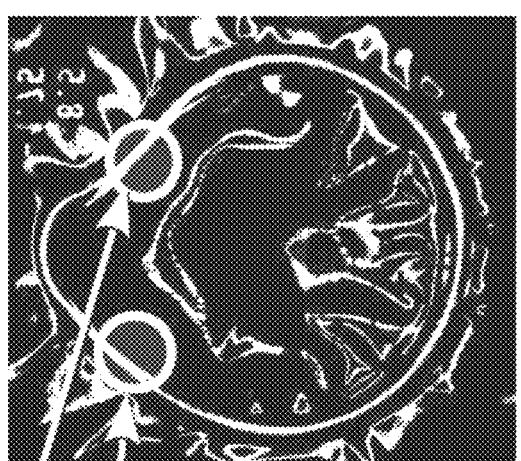
FIG. 4B shows an extracted gray scale image of FIG. 4D enhanced by illumination of 460-490 NM wavelength.
Figure 4C:
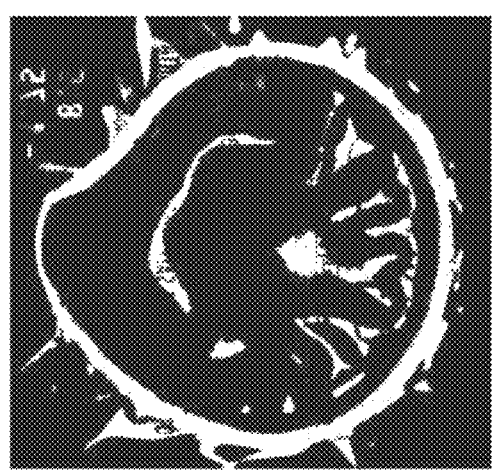
FIG. 4C shows an extracted gray scale image of FIG. 4D enhanced by illumination of 620-645 NM wavelength.
Figure 4D:
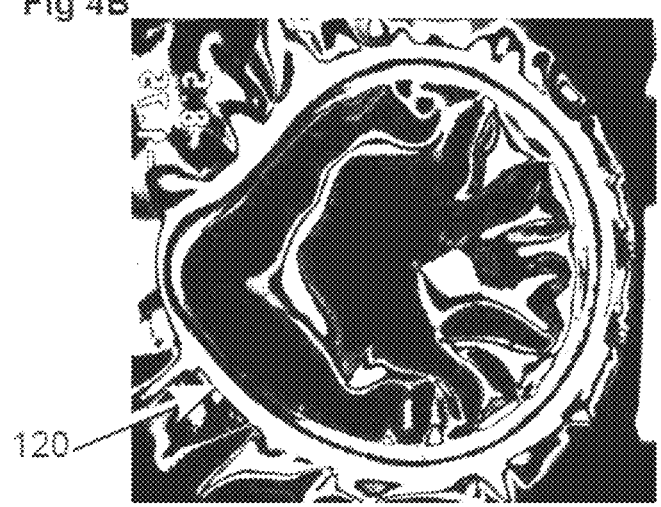
FIG. 4D shows an enhanced contrast image of the defective blister pack illuminated with wavelength in the region of 460-645 NM wavelengths.

FIG. 4D is a binarized image of a composite image of a blister package illuminated by three wavelengths of light consisting of the RED, GREEN and BLUE LEDs. In the binarized image of FIG. 4D the perimeter area 120 is visible where the foil 110 was thermally bonded to the top surface of the Blister pack 100. FIG. 4A is an extracted image from FIG. 4D illuminated by RED LEDs. FIG. 4C is an extracted image of FIG. 4D illuminated by GREEN LEDs & FIG. 4B is an extracted image of FIG. 4D illuminated by BLUE LEDs. In effect three images are preferably extracted from the composite image of FIG. 4D, each image enhancing a different feature of the top surface of the blister.

The binarized image in FIG. 4C shows the perimeter area of 120 as a continuous line with no broken areas. Although the binarized image shown in FIG. 4B shows continuous line, it is easy to observe unusual behavior at position Y1 and Y2, where the width of the illuminated strip is much thicker than the rest of the illuminated strip. The algorithm measures the width of the illuminated strip along the circumference, and compares them with a predetermined value programmed during setup. If the value is higher than the predetermined value, the blister is rejected as a faulty sealant defect.

Furthermore, the binarized image shown in FIG. 4A, indicates a break in the area 120 at positions shown by circles X1 and X2. As evident the positions X1 and X2 would not have been detectable if the blister had not been illuminated with GREEN or BLUE LEDs. This form of breakage in the sealing area of 120 indicates a defective seal. The algorithm measures the breakage in the circles X1 and X2 and compares the bigger of the two areas with a predetermined value of the area programmed during setup. If the value is higher than the predetermined value, the blister is rejected as a faulty sealant defect.

A person skilled in the art will realize that such breakages can be highlighted only if illuminated with multiple wavelengths of illumination and therefore a detailed analysis will be required in all three images as shown in FIG. 4A, FIG. 4B and FIG. 4C.

In another embodiment of the invention, different types of illumination with other wavelengths maybe incorporated as part of the illumination segments 220, 230 and 240 or implemented as a separate module to enable capturing of several more enhanced images were necessary.

Figure 5A:
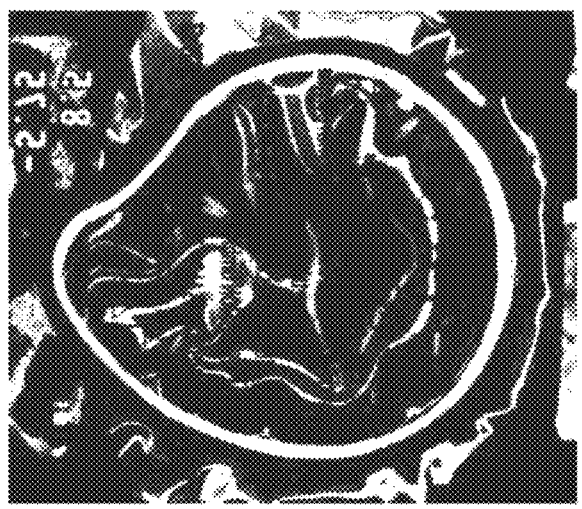
FIG. 5A shows an extracted gray scale image of FIG. 5D enhanced by illumination of 520-550 NM wavelength.
Figure 5B:
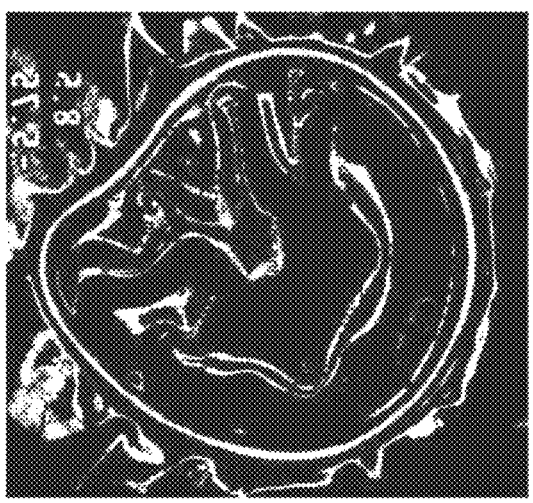
FIG. 5B shows an extracted gray scale image of FIG. 5D enhanced by illumination of 460-490 NM wavelength.
Figure 5C:
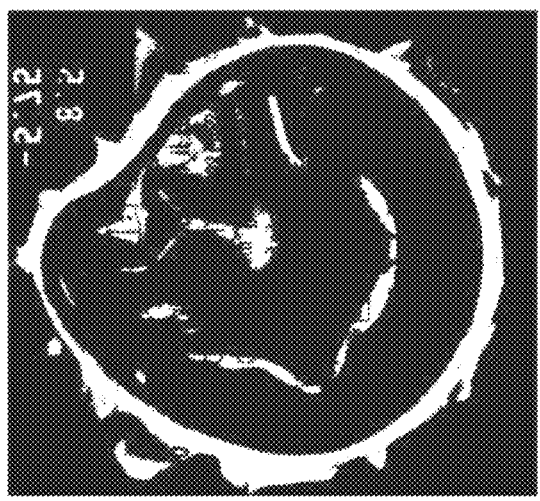
FIG. 5C shows an extracted gray scale image of FIG. 5D enhanced by illumination of 620-645 NM wavelength.
Figure 5D:
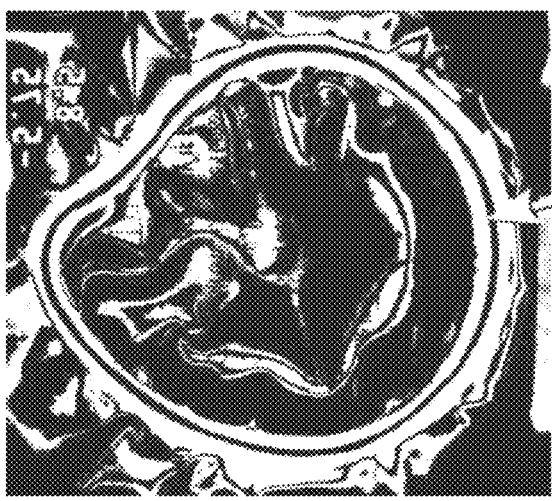
FIG. 5D shows an enhanced contrast image of a good blister pack illuminated with wavelength in the region of 460-645 NM.

FIG. 5D is a binarized image of a composite image of a blister package illuminated by three wavelengths of light consisting of the RED, GREEN and BLUE LEDs. In the binarized image of FIG. 5D the perimeter area 120 is visible where the foil 110 was thermally bonded to the top surface of the Blister pack 100. FIG. 5A is an extracted image from FIG. 5D illuminated by RED LEDs. FIG. 5C is an extracted image of FIG. 5D illuminated by GREEN LEDs & FIG. 5B is an extracted image of FIG. 5D illuminated by BLUE LEDs.

The binarized image in FIG. 5A, FIG. 5C and FIG. 5B shows the perimeter area of 120 as a continuous line with no broken areas and therefore classified as a Good seal blister package.

In the foregoing description the invention has been described with reference to specific embodiment thereof. It will, however, be evident that various modifications and changes may be made thereto by a skilled person in the art to apply this invention to a broad spectrum of industries (For eg: in the food, automotive, liquid and chemical packaging industries) without deviating from the broader spirit and scope of the invention.

The invention claimed is:

1. A system of inspecting a quality of a sealing area on a top surface of a foil of a blister package, said system comprising:
a plurality of illumination emitters positioned to direct illumination on the top surface of the foil of the blister package, each illumination emitter arranged to receive an electrical pulse to trigger illumination at different intervals, so as to illuminate a seal that is thermally bonded to the top surface of the blister package, said illumination emitters configured to emit light within a visible spectrum, said light includes a short wavelength, an intermediate wavelength and a long wavelength;
a camera having an optical sensor, directed to the top surface;
said optical sensor arranged to capture a plurality of images of the top surface and seal corresponding to a strobed illumination of the seal by said light;
a computer arranged to receive the plurality of captured images from the optical sensor, and further arranged to analyze and process the images captured, said computer further arranged to determine if the seal on the blister package is acceptable, or to be rejected, if the blister package has an air gap in the sealing area;
wherein the illumination emitters and camera are arranged to be triggered at different times so as to create a delay between illumination and image captured, so that an image of the top surface is captured using the short wavelength, the intermediate wavelength, and the long wavelength.

2. The system of claim 1, wherein the illumination emitters comprise light emitting diodes (LEDs) to emit the light.

3. The system of claim 1, wherein the computer is arranged to receive three different images from the optical sensor, each of the three different images corresponding to the short, intermediate and long wavelength of illumination.

4. The system of claim 1, wherein one of said predetermined set of values includes a continuity of a sealing pattern with the sealing area.

5. The system of claim 1, wherein one of said predetermined set of values includes a size of a break in the sealing area.

6. The system of claim 5, wherein the computer is arranged to compare the size of the break in a sealing pattern with a comparison table, said comparison table comprising the predetermined values for an acceptable sealing pattern to decide if the package is acceptable or to be rejected.

7. A method of inspecting and detecting a defect in a sealing area on a top surface of a foil of a blister package, said method comprising:
sending an electrical pulse to at least a plurality of illumination emitters to trigger illumination at different intervals, thereby illuminating a seal that is thermally bonded to the top surface of the blister package, said plurality of illumination emitters positioned to direct illumination on the top surface of a foil of the blister package, said illumination emitters configured to emit light within a visible spectrum, said light includes a short wavelength, an intermediate wavelength and a long wavelength;
triggering a camera, said camera having an optical sensor, directed to the top surface, and consequently capturing a plurality of images of the top surface corresponding to a strobed illumination of the top surface;
said optical sensor capturing a plurality of images of the top surface and seal corresponding to a strobed illumination of the seal;
transferring the captured images to a computer;
extracting multiple images of different wavelengths from the captured images, so that an image of the top surface is captured using the short wavelength, the intermediate wavelength, and the long wavelength;
analyzing a sealing pattern of the sealing area to produce analyzed values of the sealing area and then comparing the analyzed values with a set of a predetermined range of values; and
accepting the blister package if the analyzed values of the sealing area are within the predetermined range or rejecting the blister package, if the blister package has an air gap in the sealing area;

wherein the triggering steps of the illumination emitters and camera are at different times so as to create a delay between steps.

8. The method of claim 7, wherein captured images of the sealing area are analyzed for a single continuous pattern.

9. The method of claim 7, wherein the analyzing includes analyzing the captured images of the sealing area for a single continuous pattern in all extracted images for different wavelengths.

10. The method of claim 9, wherein the analyzing includes measuring any breaks in continuity in the sealing area.

11. The method of claim 10, wherein the accepting includes making a decision to accept or reject the blister package if measured values of the sealing pattern breaks are within or outside the range of predetermined values, respectively.

12. The system according to claim 1, wherein the illumination emitters comprise multiple segments of light emitting diodes (LEDs), each of said segments arranged to omit one of said wavelengths, said segments each arranged to be selectively switched on and off.

13. The method according to claim 7, wherein the illumination emitters comprise multiple segments of light emitting diodes (LEDs), each of said segments arranged to omit one of said wavelengths, such that the triggering for the illumination emitters includes selectively switching each segment on and off.

14. The system according to claim 12, wherein the segments are arranged to be switched on simultaneously so as to capture one single image.

15. The method according to claim 13, wherein the segments are arranged to be switched on simultaneously so as to capture one single image.

16. The system according to claim 1, wherein the short wavelength is blue light, the intermediate wavelength is green light, and the long wavelength is red light.

17. The method according to claim 7, wherein the short wavelength is blue light, the intermediate wavelength is green light, and the long wavelength is red light.

* * * * *